March 4, 1924.

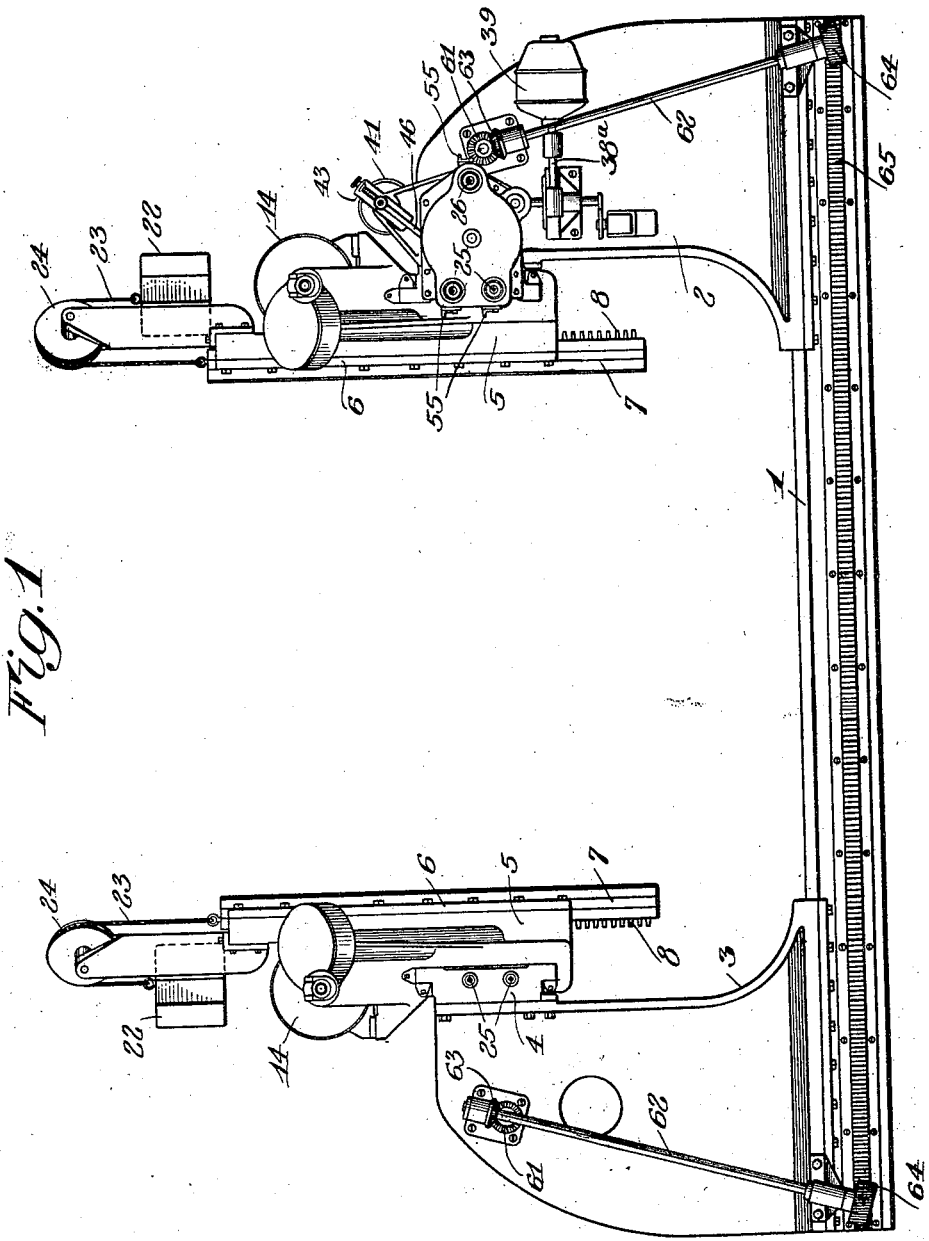

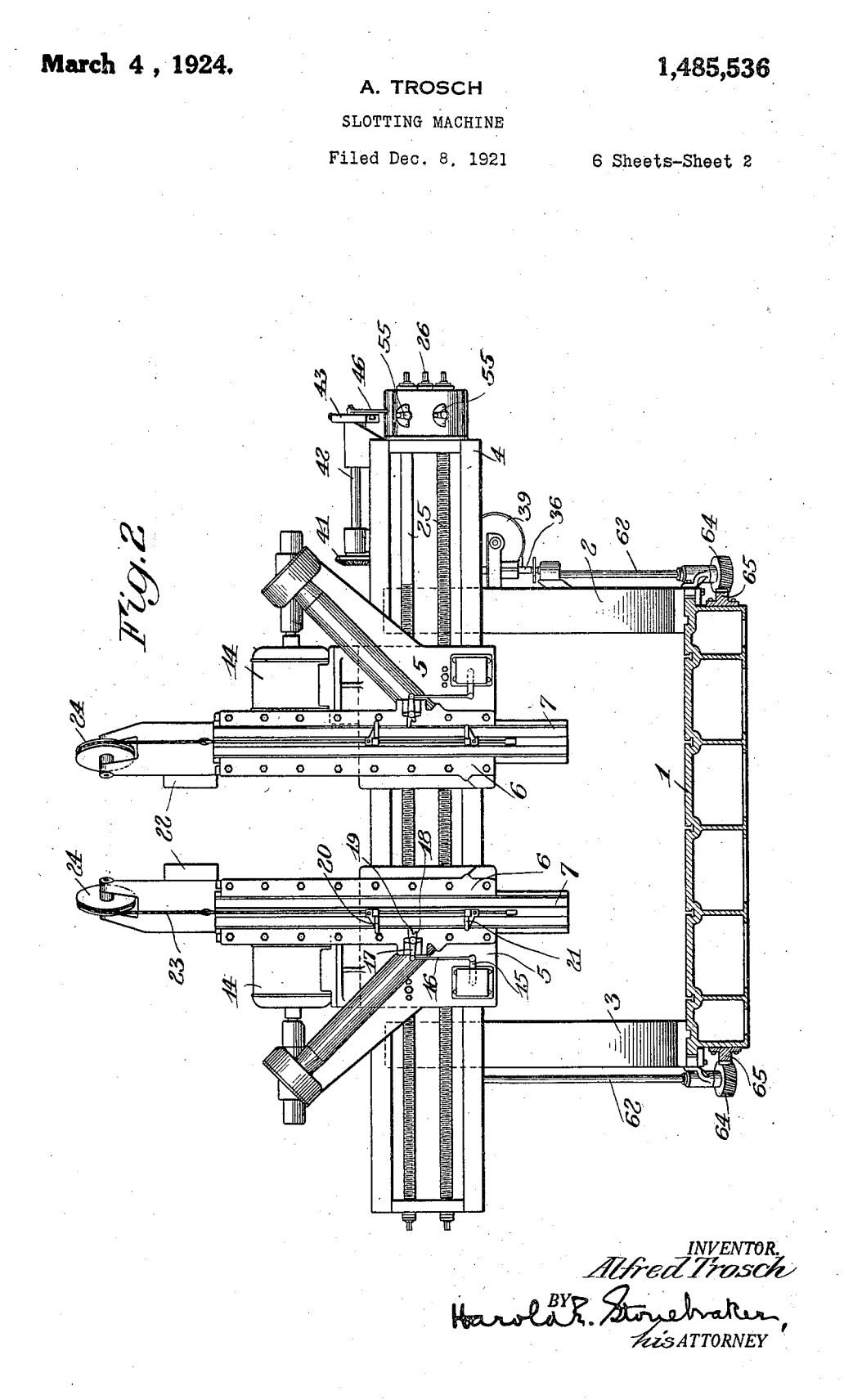

A. TROSCH

SLOTTING MACHINE

Filed Dec. 8, 1921

INVENTOR.
Alfred Trosch
BY Harold R. Stonebraker,
his ATTORNEY

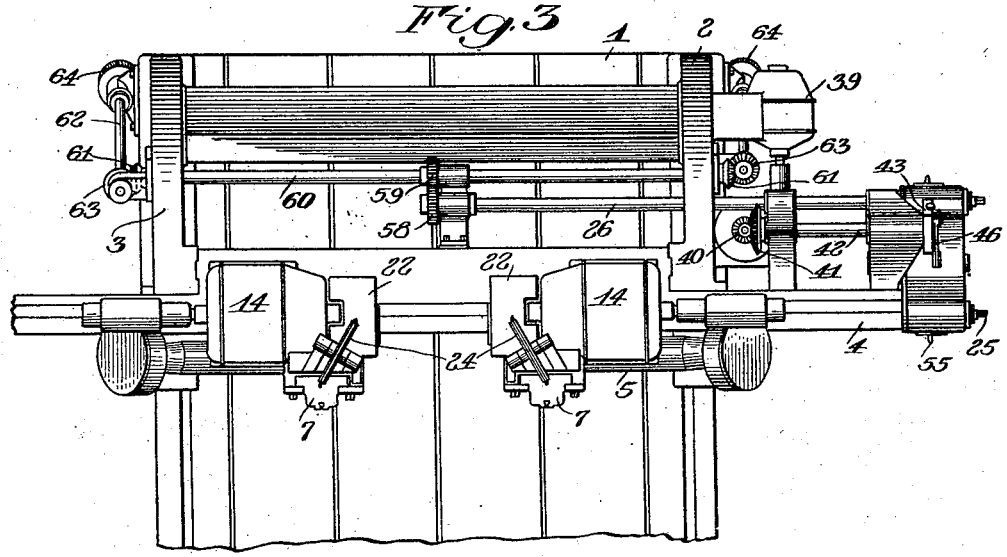
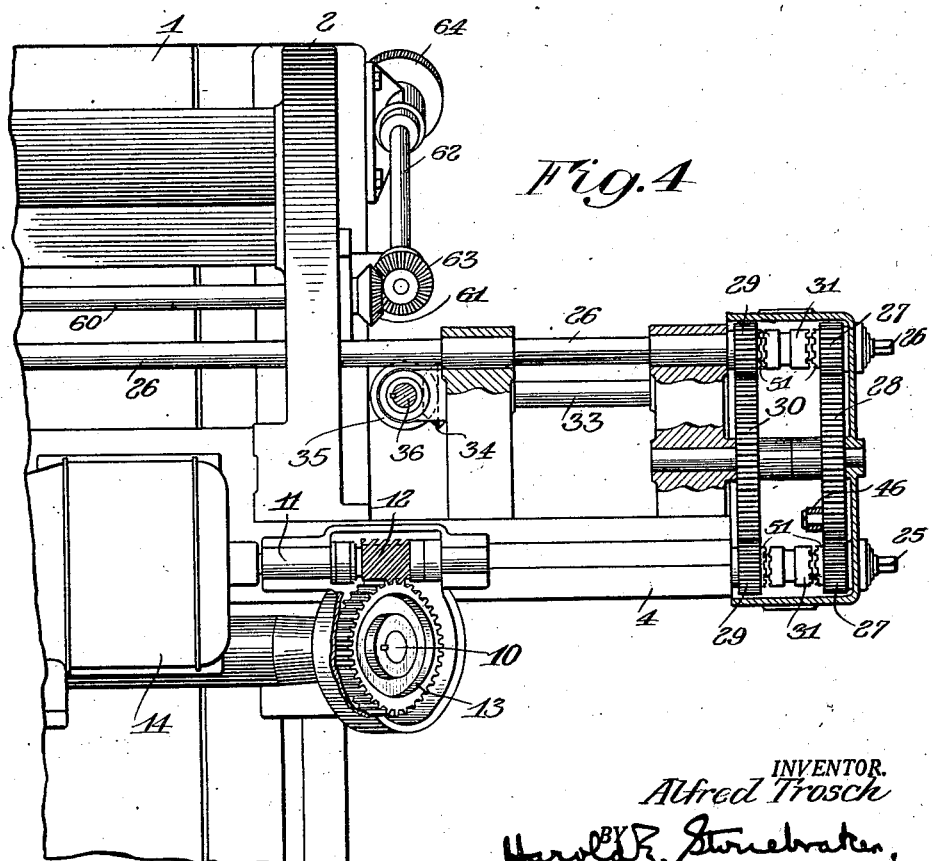

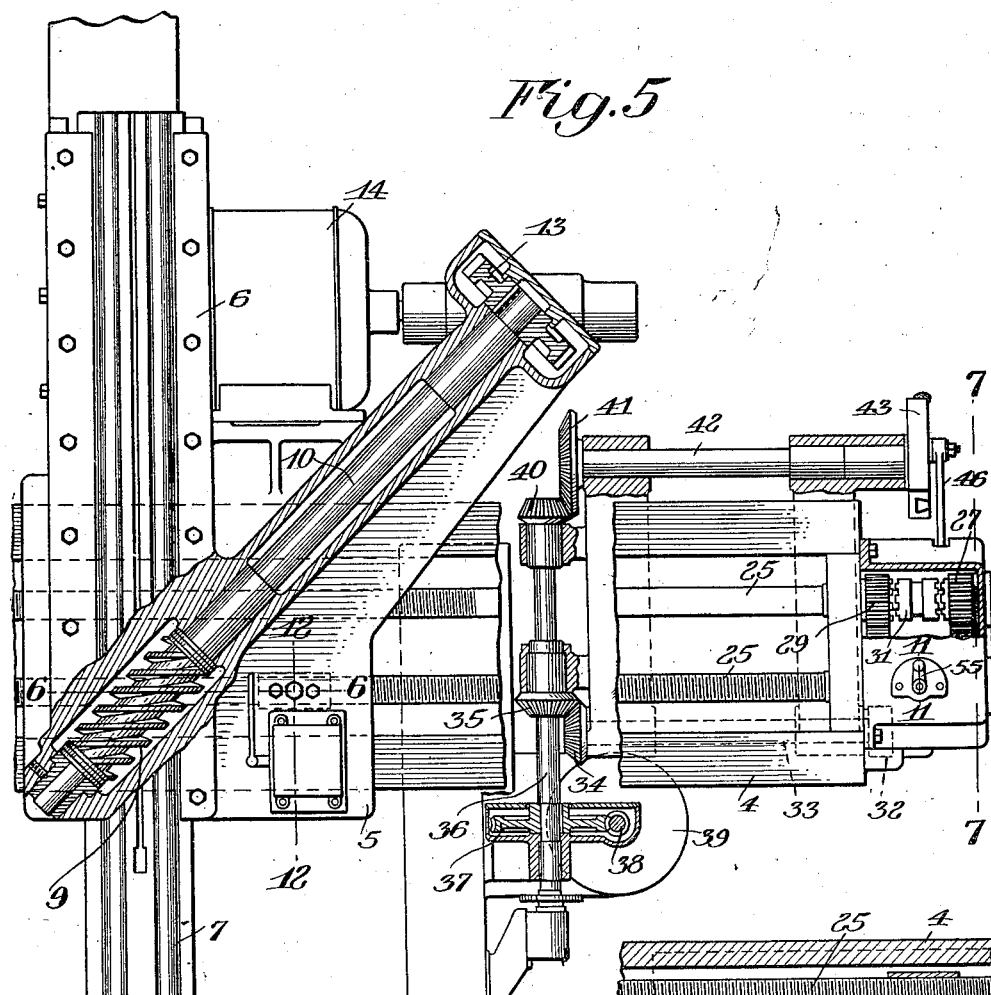

March 4, 1924.
A. TROSCH
SLOTTING MACHINE
Filed Dec. 8, 1921 6 Sheets-Sheet 5
1,485,536
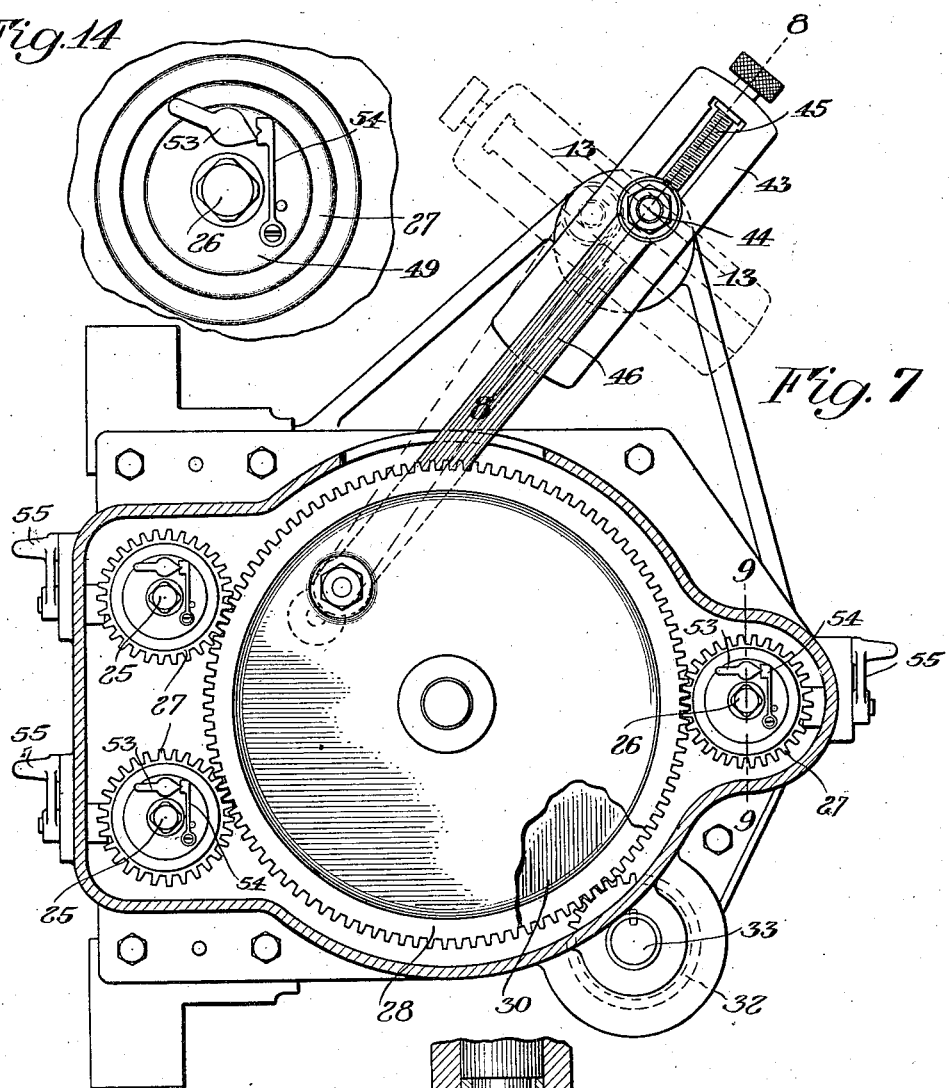
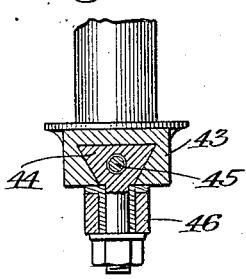
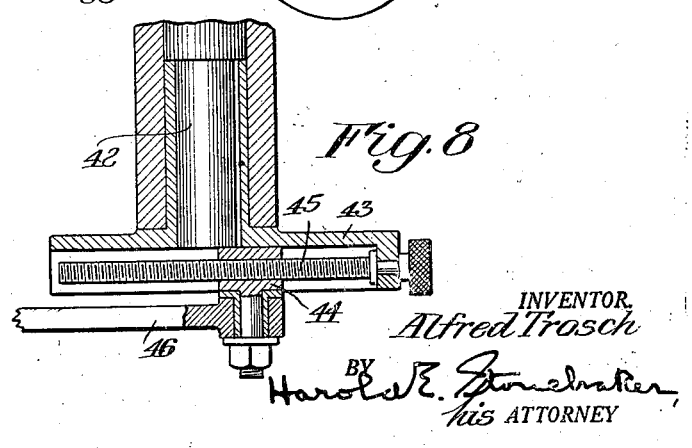
INVENTOR.
Alfred Trosch
BY Harold E. Stonebraker,
his ATTORNEY March 4, 1924.
A. TROSCH
SLOTTING MACHINE
Filed Dec. 8, 1921
1,485,536
6 Sheets-Sheet 6
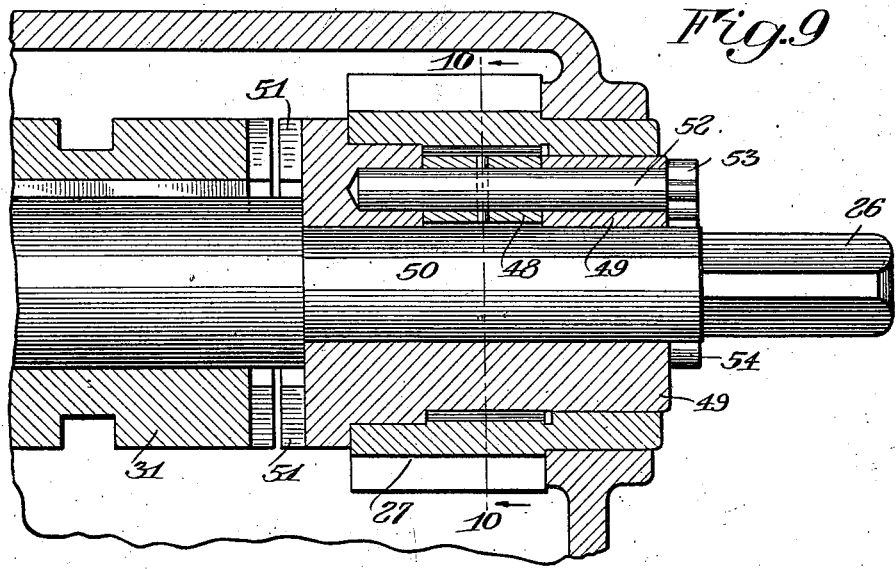
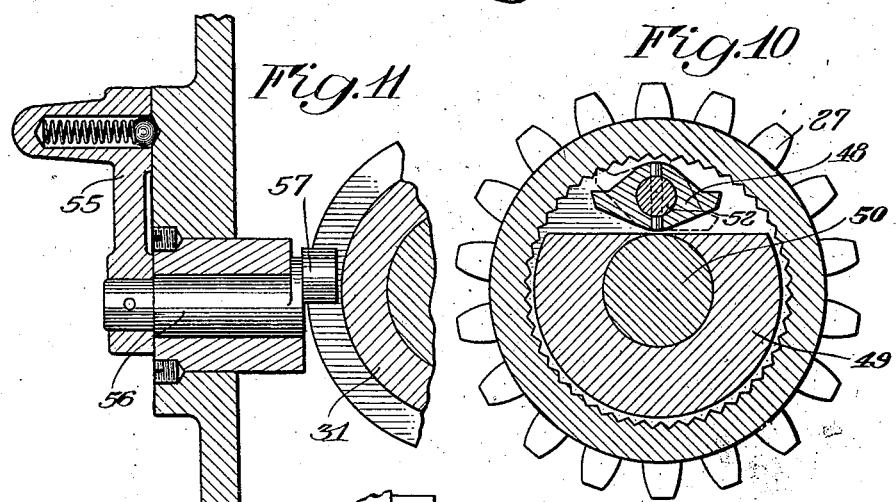
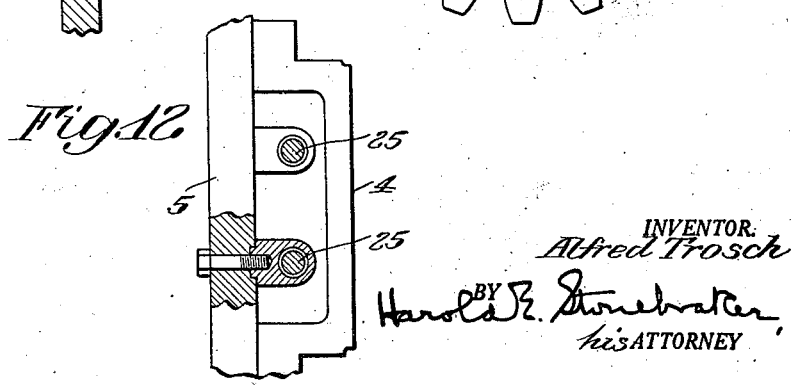
INVENTOR.
Alfred Trosch
BY Harold E. Stonebraker
his ATTORNEY Patented Mar. 4, 1924.

1,485,536

UNITED STATES PATENT OFFICE.

ALFRED TROSCH, OF ROCHESTER, NEW YORK, ASSIGNOR TO ARTHUR H. INGLE, OF ROCHESTER, NEW YORK.

SLOTTING MACHINE.

Application filed December 8, 1921. Serial No. 520,955.

*To all whom it may concern:*

Be it known that I, ALFRED TROSCH, a citizen of the United States of America, residing at Rochester, in the county of Monroe and State of New York, have invented certain new and useful Improvements in Slotting Machines, of which the following is a specification.

My invention relates to metal working machines, being particularly adapted to slotting machines involving vertically reciprocating tools, and it has for one of its principal objects to afford a simple and efficient drive mechanism for the tools, characterized by ruggedness and stability as well as a smooth running and quiet action.

An additional purpose is to afford an arrangement of tool drive mechanism, that lends itself readily to utilizing in a machine of this type an electric motor control.

In machines of the general class to which the invention is applicable, a tool carrying ram is mounted on a saddle which is adjustable on a cross rail, and the cross rail is mounted on a housing adjustable along a bed, while feed and rapid traverse mechanisms are provided for selectively operating the saddle or housing either to feed or to return, and another object of the invention is to afford a simplified and efficient arrangement whereby both the feed and rapid traverse mechanisms are operated from a single driving or power shaft, and the movements of such power shaft are controlled from an electric motor.

Still a further purpose of the invention is to provide an improved form of operative connection between the housing and the bed, for propelling the housing along the bed, the arrangement contemplated being such as to afford a smooth running and quiet driving action, and to protect the intermeshing gear members against the accumulation of dust or metal filings, which would otherwise interfere with the proper control of the machine.

The invention also comprehends various other advantageous features, all of which will appear clearly from the following detailed description, in conjunction with the accompanying drawings, the novel features being pointed out in the claims following the description.

In the drawings:

Figure 1 is a side elevation of a machine constructed in accordance with a preferred embodiment of the invention;

Figure 2 is a transverse vertical sectional view through the bed, illustrating the housing, tool saddles and tool carrying rams in front elevation;

Figure 3 is a plan view with parts broken away;

Figure 4 is an enlarged partial plan view with portions in horizontal section;

Figure 5 is a vertical sectional view, with parts appearing in elevation;

Figure 6 is a detail sectional view on line 6—6 of Figure 5;

Figure 7 is a vertical sectional view on line 7—7 of Figure 5, with parts in elevation;

Figure 8 is a sectional view on line 8—8 of Figure 7;

Figure 9 is a sectional view on line 9—9 of Figure 7;

Figure 10 is a sectional view on line 10—10 of Figure 9;

Figure 11 is a sectional view on line 11—11 of Figure 5;

Figure 12 is a sectional view on line 12—12 of Figure 5;

Figure 13 is a sectional view on line 13—13 of Figure 7, and

Figure 14 is an enlarged detail view in elevation, looking at the right hand end of Figure 9.

The several features of my invention may be applied in various ways to different types of metal working machines, and by way of illustration, I have disclosed one example, which comprises, in general, a bed 1, see Figures 1 and 2, upon which are mounted for longitudinal adjustment two tool carrying units or housings which are alike in every respect, so that for convenience but one will be described. Each of said housings consists of uprights 2 and 3, upon which is supported a cross rail 4, and the latter has mounted thereon for horizontal adjustment a pair of saddles 5. The saddles 5 are similarly constructed, and it is therefore necessary to describe only one in detail. Each saddle 5 is grooved vertically and provided with plates 6, overlying said groove to afford a guideway within which is arranged a vertically reciprocatory tool carrying ram 7, and I will first describe the mechanism by which the ram 7, and the tool mounted thereon, is operated upwardly and downwardly.

The ram 7 is provided on its rear face with a rack 8, having straight teeth preferably extending horizontally, and at right angles to the vertical direction of travel of the ram and tool rack. Engaging the rack 8 is a worm 9 which is keyed on a transmission shaft 10 and provided with a spiral tooth preferably at a forty-five degree angle. The transmission shaft 10 is arranged preferably at angles of forty-five degrees with reference to the rack 8, and to the horizontally arranged driving shaft 11, see Figures 4 and 5, which has keyed thereon a worm 12 engaging a worm gear 13 keyed on the transmission shaft 10. The driving shaft 11, which is at right angles to the direction of travel of the ram, is an extension of the shaft of a reversible electric motor 14, which serves to control the movements of the tool carrying ram through the gearing just described. This arrangement affords a simple, smooth running, and extremely efficient drive to the tool carrying rams, and by means of the relation between the rack and intermeshing worm, friction losses between these parts is reduced to a minimum.

The electric motor just mentioned is automatically reversed by means controlled by the tool carrying ram, and to accomplish this, a master switch, of well known type such as commonly used with reversing planers, and similar reversing motor equipment, is provided to cooperate with the electric motor 14, the details of said switch not being illustrated, as they form no part of this invention and are unnecessary to a proper understanding. Said switch is operated by a lever 15, to which is pivoted a connecting rod 16, the latter in turn being pivotally connected to an arm 17. The arm 17 is pivotally supported on a suitable bracket, and is provided with offset portions 18 and 19, which are located in the paths of stops 20 and 21 respectively, the latter being adjustably attached at any desired positions vertically of the tool carrying ram 7. The arm 17 is illustrated in Figure 2 in neutral position, and by moving it manually upwardly or downwardly, the circuit to motor 14 is closed, and the tool carrying ram commences to operate. Assuming that the ram is travelling downwardly, when it reaches the bottom of its stroke, stop 20 engages the portion 18 and shifts the lever 15 and likewise the switch, thereby reversing the direction of travel of the motor 14. This causes the tool carrying ram to travel upwardly until stop 21 engages the portion 19 on the arm 17, thereby shifting the switch to its opposite position, and causing the motor to be again reversed and the tool carrying ram to travel downwardly. This operation continues until the arm 17 is manually shifted to its neutral or intermediate position, breaking the motor circuit. The tool carrying ram 7 is counterbalanced by a weight 22 connected thereto by a cable 23 which travels over a guide pulley 24 at the top of the machine.

The saddles 5 on each cross rail 4 are adjustable laterally thereon by a feed mechanism or by a rapid traverse mechanism, which likewise control the longitudinal adjustments of the housing, on which the saddles are supported, and this mechanism will now be described. The saddles 5 are operated laterally either for feed or rapid traverse by feed screws 25, as usual in this type of machinery, see Figures 2 and 5, while the longitudinal feed or rapid traverse of the housing is effected by a feed shaft 26, see Figure 3, and these shafts are governed in the following manner. Referring to Figures 4, 5 and 7, the feed screws 25 and the feed shaft 26 have loosely mounted thereon feed pinions 27 which are engaged and driven by a common feed gear 28, the operation of which will be described presently; also loosely mounted on said feed screws 25 and feed shaft 26 are rapid traverse pinions 29 which are engaged and operated by a common rapid traverse gear 30, arranged coaxially of the feed gear 28, while 31 designate manually slidable clutches which are keyed to and selectively adjustable on the respective feed screws 25 and feed shaft 26 to be operated by either the feed pinions 27 or the rapid traverse pinions 29. Thus, by manually shifting the clutches 31, it is possible to selectively bring said shafts or driven elements, and likewise the saddles and housing, into operative relationship with the feed gear 28 or the rapid traverse gear 30, through the aforementioned pinions driven thereby.

The rapid traverse gear 30, see Figure 7, is driven by a pinion 32 keyed on a shaft 33, see Figure 5, which carries a bevel pinion 34, in turn operated by the bevel pinion 35, the latter being fixed upon a driving or power shaft 36. The power shaft 36 carries fixed thereon a worm gear 37 which is engaged by a worm 38, see Figure 5, the latter being fixed upon an extension 38$^a$ of the motor shaft of electric motor 39, see Figure 1. The power or driving shaft 36, which operates the rapid traverse gear, as just described, also serves to operate the feed gear 28, and the mechanism by which the feed gear is controlled will now be set forth in detail.

The driving shaft 36 carries at its upper end a bevel pinion 40, see Figure 5, which engages a bevel pinion 41 fixed on the shaft 42, the latter being arranged parallel to the aforementioned shaft 33, and both said shafts 33 and 42 being operated from the common driving shaft 36. The shaft 42 normally has an intermittent rotary motion, for the purpose of oscillating the feed gear 28, which is operatively connected thereto. To this end, the shaft 42 has fixed thereon a feed box 43, see Figure 7, which is rotatable with the shaft 42, in the direction indicated by dotted lines. The feed box 43 is slotted to receive a longitudinally adjustable block 44, the position of which in the feed box is determined by the adjusting screw 45. 46 is a connecting rod which is pivoted at one end to the block 44 and at its opposite end to the feed gear 28.

From this arrangement, it will be seen that as the shaft 42 is rotated through a complete revolution, the feed gear 28 is oscillated through an arc, the length of which depends upon the distance that the block 44 is adjusted away from the center of the shaft 42. As the feed gear 28 turns in one direction, see Figure 7, it rotates all the feed pinions 27 correspondingly, and as it rotates in the opposite direction it rotates them reversely. Referring to Figures 9 and 10, each feed pinion 27 is provided with internal teeth 47, adapted to cooperate with a reversible dog 48, which is pivoted on a collar 49, the latter being rotatively arranged on the reduced end 50 of the feed screw or feed shaft, as the case may be, and the collar 49 has a clutch face 51 adapted to engage the slidable clutch 31 when the latter is shifted manually to cause the feed mechanism to function. It will be observed that as each feed pinion 27 turns in one direction, it rides over the dog 48, see Figures 9 and 10, and as it turns in the opposite direction it carries with it the dog 48 and the collar 49, thereby turning the corresponding feed screw or shaft, if its clutch 31 is adjusted to the proper position for this operation.

Provision is made whereby the initial turning of the feed pinions 27 in one direction takes place as the tool carrying ram reaches the bottom of its stroke, thus setting the feed pinions with reference to the dogs 48, and when the tool carrying ram reaches the top of its stroke, clearing the work, the feed pinions 27 are turned in the opposite directions and thereby operate the collars 49 and the corresponding feed screws or shaft upon which the clutches 31 are keyed, assuming that the clutches 31 are engaged with the clutch faces 51.

To accomplish this, the shaft 42 is intermittently rotated far enough to turn the feed box 43 through one-half a revolution, both at the bottom and the top of the stroke of the tool carrying ram, thereby oscillating the feed gear 28 and likewise the feed pinions 27. The electric motor 39, which controls the driving shaft 36, is automatically started and stopped, both at the bottom and top of the stroke of the tool carrying ram, to effect the intermittent rotation of the shaft 42 just described, this automatic operation of the motor being brought about through the switch already described, which is controlled by the stops 20 and 21, see Figure 2, the details of this electrical control forming no part of the invention. A suitable switch is also supplied which is adapted to be manually operated to maintain the circuit to motor 39 closed during operation of any of the units by the rapid traverse mechanism, it being understood that for rapid traverse operations, the power shaft 36 turns continuously, while for feed operations, the power shaft 36 is automatically started and stopped as previously described.

The connecting rod 46 and feed box 43 are arranged so as to be normally parallel, as illustrated in Figure 7, the result of which arrangement is that as the feed box 43 and shaft 42 commence to turn, the minimum load is applied initially. This load is gradually increased as the feed box turns, as indicated by dotted lines in Figure 7, and this action tends to produce a quiet running and uniform operation, with a minimum strain on the several parts, which is exceedingly important in machines of this type that are generally employed for massive and heavy work and where the strains, even under normal conditions, are very great.

In case it is desired to change the direction of feed of any one of the driven elements, each dog 48 is adjustable, see Figures 9 and 10, and to this end is mounted on a pin 52, which carries an adjusting handle 53 at its outer end, the latter being held in either position of adjustment by a spring 54. Each of the clutches 31 is manually controlled by a handle 55, see Figure 11, fixed on an arbor 56, which carries an eccentric pin 57 engaging a groove in the clutch 31. By turning any one of the handles 55 in one direction or the other, see Figures 1 and 11, the corresponding clutch is shifted to the left or to the right, and thus the feed mechanism or rapid traverse mechanism is adapted to be selectively brought into cooperation with either saddle or with the housing, it being understood that there is one feed mechanism and rapid traverse mechanism for each housing and pair of saddles arranged thereon. I will now describe the mechanism by which the feed and rapid traverse motions are transmitted from the feed shaft 26 to the housing.

Referring to Figures 1, 2 and 3, the shaft 26 carries a pinion 58 engaging a pinion 59 fixed on a cross shaft 60, which extends laterally to both sides of the housing, and carries at each end thereof a bevel pinon 61. Arranged at both sides of the housing, and journalled thereon, are rotary spindles 62 which are disposed at an angle to a vertical plane and carry at their upper ends bevel pinons 63, engaged and driven by the aforementioned bevel pinions 61. At their lower ends, the spindles 62 are provided with spiral pinions 64 which engage the toothed racks 65 fixed upon the bed of the machine at both sides thereof. The racks 65 extend longitudinally of the bed, the teeth thereof being arranged vertically so that the racks are effectively protected against injury, and any dust or metal filings will readily fall through the rack, and thus not interfere with the proper cooperation between the spiral pinions 64 and the racks. By arranging the spindles 62 at an angle to a vertical plane, and utilizing spiral gears for engagement with the racks on the bed, a quiet and efficient drive is obtained, which reduces friction and eliminates chatter and lost motion, this contributing in large measure to the smooth running and quiet action of the entire mechanism. The spindles 62 are operated from the feed or rapid traverse mechanisms already described, so as to feed the housing along the bed intermittently, or to return it quickly under rapid traverse control, and by the gearing arrangement just described, I insure a quiet operation, and an immediate and accurate response of the housing to the feed or rapid traverse mechanism, whichever happens to be selected by the operator.

While I have disclosed the details of an exemplary machine, the features of the invention are not to be confined to the particular arrangements or relationships herein described, as this application is intended to cover any modifications or departures that may fairly come within the scope of the invention and of the following claims.

I claim:

1. A metal working machine comprising a vertically reciprocating tool carrying ram, a reversible electric motor, operative connections between said motor and ram, and means controlled by the ram and acting automatically to reverse the motor and thereby reciprocate the ram.

2. A metal working machine comprising a vertically reciprocating tool carrying ram having a rack thereon, an electric motor including a horizontally arranged motor shaft, a transmission shaft arranged at angles of substantially forty-five degrees to the rack and motor shaft, a gear on the transmission shaft engaging said worm, and a worm on the transmission shaft meshing with said rack.

3. A metal working machine comprising a vertically reciprocating tool carrying ram having a rack thereon, a reversible electric motor including a motor shaft having a worm thereon, a transmission shaft having a gear engaging said worm, a worm on the transmission shaft meshing with said rack, and means controlled by the ram and acting automatically to reverse said motor and thereby reciprocate the ram.

4. A metal working machine comprising a reciprocating tool carrying ram having a rack thereon, a driving shaft, a worm keyed to said driving shaft, a transmission shaft having a gear engaging said worm, and a worm on said transmission shaft meshing with said rack.

5. A metal working machine comprising a reciprocating tool carrying ram having a rack thereon, a driving shaft arranged at a right angle to the direction of travel of the ram, a worm on said driving shaft, a transmission shaft arranged at angles of substantially forty-five degrees to said ram and driving shaft, a gear on the transmission shaft engaging said worm, and a worm on the transmission shaft engaging the rack.

6. A metal working machine comprising a bed, a rack fixed to the bed, a housing adjustable on said bed, and a rotary spindle mounted on the housing and having a gear engaging said rack on the bed.

7. A metal working machine comprising a bed, a rack fixed to the bed and having its teeth arranged vertically, a housing adjustable on the bed, and a rotary spindle mounted on the housing and having a gear engaging said rack.

8. A metal working machine comprising a bed, a rack fixed to the bed at one side thereof and having its teeth arranged vertically, a housing adjustable on the bed, and a rotary spindle mounted on the housing at an angle to a vertical plane and having a spiral gear at its lower end engaging said rack.

9. A metal working machine comprising a housing, a cross rail supported by said housing, a saddle adjustable laterally on the cross rail, a feed screw for said saddle, feed mechanism for operating the feed screw, rapid traverse mechanism for operating the feed screw, means for selectively placing the feed screw under the control of the rapid traverse mechanism or of the feed mechanism, and a single driving shaft operating both the feed mechanism and the rapid traverse mechanism.

10. A metal working machine comprising a bed, a housing adjustable longitudinally of the bed, a cross rail carried by the housing, a saddle adjustable on the cross rail, feed mechanism controlling the lateral feed movement of the saddle and the longitudinal feed movement of the housing, rapid traverse mechanism for also controlling said saddle or housing, means for selectively placing the saddle or housing under the control of either the feed mechanism or rapid traverse mechanism, and a single driving shaft operating both the feed mechanism and the rapid traverse mechanism.

11. A metal working machine comprising a driven member, a feed gear and a rapid traverse gear both adapted to selectively operate said driven member, and an electric motor governing the movements of both the feed gear and rapid traverse gear.

12. A metal working machine comprising a driven element, a feed gear and a rapid traverse gear co-axially arranged and adapted to selectively operate said driven element, a pair of shafts, one operatively connected with the rapid traverse gear and the other operatively connected with the feed gear, and a single driving shaft operatively associated with both the aforementioned shafts.

13. A metal working machine comprising a bed, a housing adjustable longitudinally of the bed, a cross rail mounted on the housing, a saddle adjustable laterally of the cross rail, a vertically reciprocating tool carrying ram mounted on the saddle, feed mechanism and rapid traverse mechanism adapted to be selectively brought into cooperation with said saddle and said housing so as to effect either feed or rapid traverse of the parts, the feed and rapid traverse mechanisms including respectively a feed gear and a rapid traverse gear, a single driving shaft controlling both said gears, and an electric motor controlling said driving shaft.

14. A metal working machine comprising a driven element, a feed gear for selectively controlling the driven element, a rotary shaft connected to and acting to oscillate said feed gear, and an electric motor for intermittently operating said rotary shaft.

15. A metal working machine comprising a driven element, a feed gear adapted to selectively operate the driven element, a rotary feed box, and a connecting rod between said feed gear and feed box, the feed box being arranged so that a minimum load is applied at the beginning of its stroke, such load being gradually increased until the maximum is reached.

16. A metal working machine comprising a driven element, a feed gear adapted to selectively operate the driven element, a feed box, means for intermittently turning the feed box, and a connecting rod pivoted to the feed gear and to the feed box and adjustable longitudinally of the feed box, said feed box and connecting rod being parallel when in normal position or at the beginning and end of each stroke.

17. A metal working machine comprising a reciprocating tool carrying ram, a saddle, feed mechanism controlling the saddle, an electric motor governing the feed mechanism, and devices governed by the ram for controlling said motor.

18. A metal working machine comprising a reciprocating tool carrying ram, a saddle, feed mechanism controlling the saddle, an electric motor governing the feed mechanism, and devices governed by the ram at each end of its stroke and acting to operate said motor for a period and then bring it to a stop.

19. A metal working machine comprising a reciprocating tool carrying ram, a saddle, feed mechanism controlling the saddle and including an oscillatory feed gear, an intermittently rotating shaft operatively connected with said feed gear, and an electric motor which is intermittently operated to rotate said shaft.

20. A metal working machine comprising a reciprocating tool carrying ram, a saddle, feed mechanism controlling the saddle and including an oscillatory feed gear, an intermittently rotating shaft operatively connected with said feed gear, an electric motor, and means controlled by said ram at each end of its stroke and acting automatically to operate said motor for a period and then bring it to a stop.

21. A metal working machine comprising a reciprocating tool carrying ram, a saddle, feed mechanism controlling the saddle and including an oscillatory feed gear, an intermittently rotating shaft, a feed box mounted on said shaft, a connecting rod pivoted to said feed gear and adjustably connected to said feed box, an electric motor for driving the rotating shaft, and means controlled by the ram at each end of its stroke and acting automatically to operate said motor for a period and then bring it to a stop so as to turn said feed box through one-half a revolution.

22. A metal working machine comprising a bed, a housing adjustable longitudinally of the bed, tool mechanism arranged on the housing, feed mechanism and rapid traverse mechanism controlling the feed and return movements of the housing, means for selectively placing the housing under control of either the feed or rapid traverse mechanisms, and a single driving shaft operating both the feed and rapid traverse mechanisms.

In witness whereof, I have hereunto signed my name.

ALFRED TROSCH.